United States Patent [19]

Gardner

[11] 4,077,682

[45] Mar. 7, 1978

[54] LARGE THRUST BEARING WITH LUBRICATION IN THE SPACES BETWEEN PADS

[75] Inventor: Willis W. Gardner, Waukesha, Wis.

[73] Assignee: Waukesha Bearings Corporation, Waukesha, Wis.

[21] Appl. No.: 717,298

[22] Filed: Aug. 24, 1976

[51] Int. Cl.² ............................................. F16C 17/06
[52] U.S. Cl. .................................... 308/160; 308/168
[58] Field of Search ...................... 308/35, 36, 73, 160

[56] References Cited

U.S. PATENT DOCUMENTS

| 3,814,487 | 6/1974 | Gardner | 308/160 |
| 3,912,344 | 10/1975 | McCafferty | 308/160 |
| 3,917,365 | 11/1975 | Jenness | 308/73 |

*Primary Examiner*—Richard A. Bertsch

*Attorney, Agent, or Firm*—Wheeler, Morsell, House & Fuller

[57] ABSTRACT

The bearing pads of a large tilting pad thrust bearing are extended laterally to project from both radial edges, the lateral extensions having faces which are offset inwardly relative to the faces of the pad and said extensions projecting into the spaces between the pads. Each lateral extension has a radially extending main oil duct, there being a row of oil jet ducts communicating with each main duct and opening at the surface of the lateral extension in a position to direct a row of oil jets against the runner in the space between pads, oil being pumped into the main oil duct from a circular oil manifold surrounding the pads and coupled to the main oil ducts through flexible conduits which permit the pads to tilt freely without interference.

11 Claims, 5 Drawing Figures

U.S. Patent   March 7, 1978   4,077,682
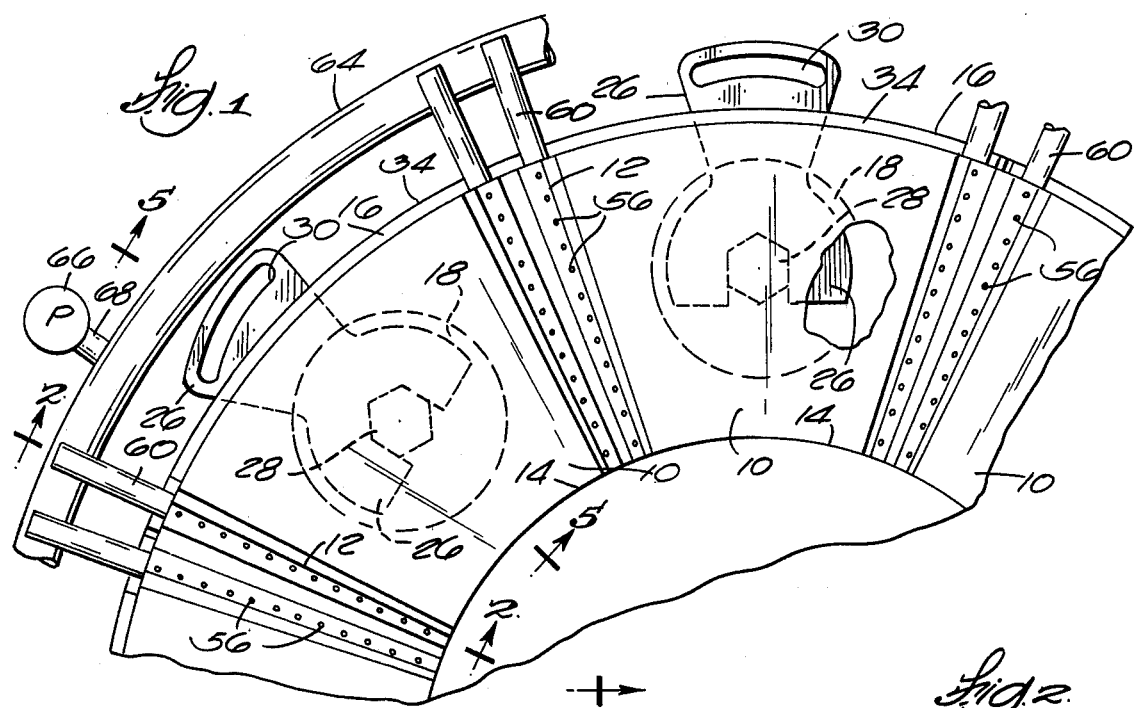
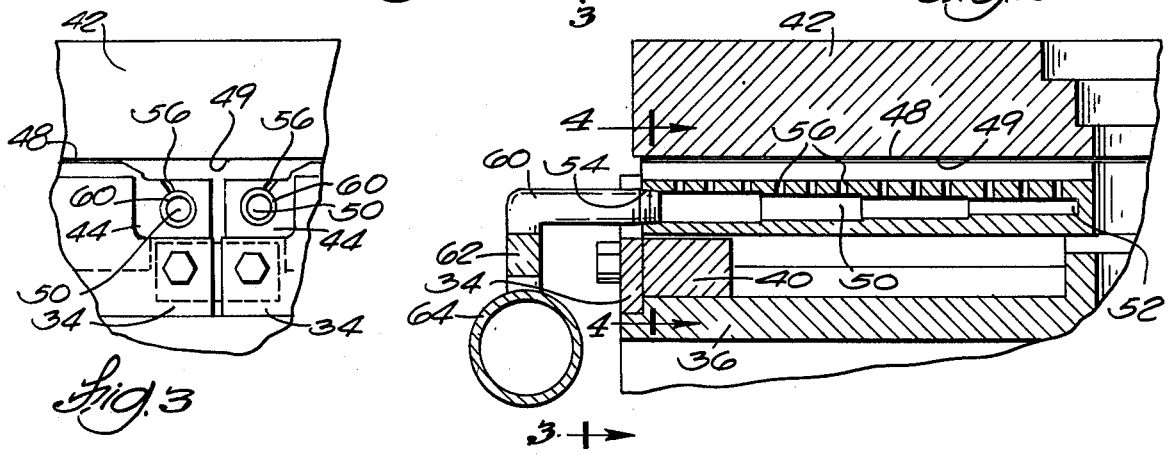
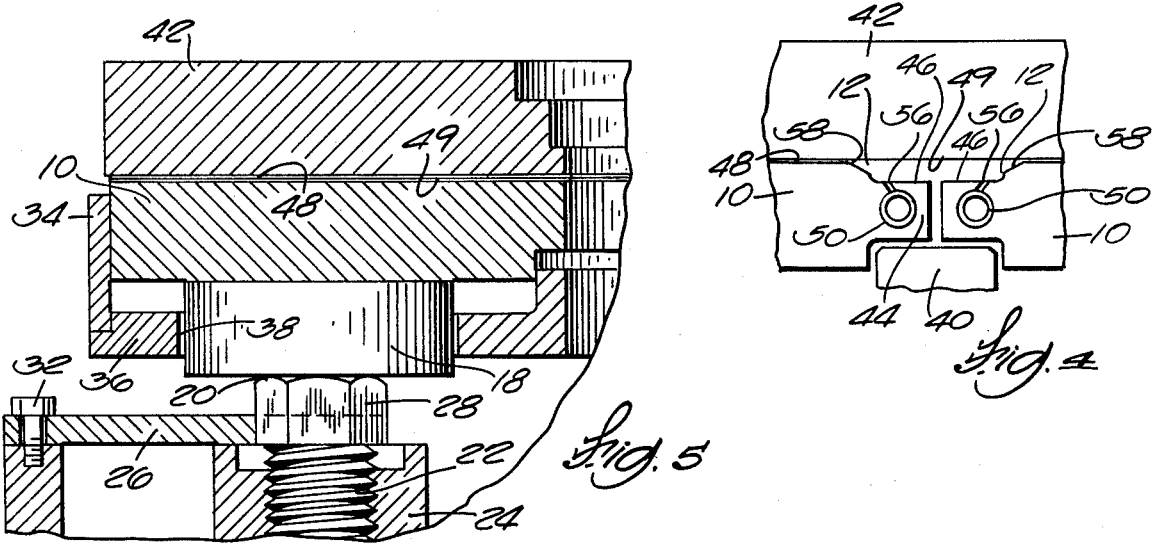

LARGE THRUST BEARING WITH LUBRICATION IN THE SPACES BETWEEN PADS

BACKGROUND OF THE INVENTION

This invention relates to large tilting pad thrust bearings of the type used in the main propulsion unit of a ship or in vertical shaft water pumps, turbines, motors, generators, or the like. Thus thrust bearings used in ships range in size from approximately 12 to 65 inches in diameter. Those used in vertical shaft rotating machinery range in size from approximately 12 to 162 inches in diameter.

Recent advances in hydro-electric machinery design have created a need for improvements in large thrust bearings due to a significant increase in the shaft speed for a given size machine. For example, some large generators which were formerly operated at 100 rpm now operate at 450 rpm. This increase in shaft speed causes the power loss within the bearing to increase sharply, and the resulting increase in pad surface temperature may exceed the operating limits of the pad material. Increased power loss also reduces the efficiency of the machine and requires cooling equipment of increased size to cool the bearings.

In small tilting pad thrust bearings, one method that has been used in the past to cool the bearing is to drill oil ducts in the individual pads proper, the ducts being positioned to direct jets of cool oil against the runner in the spaces between pads. These oil ducts open on their lower ends into a circular oil groove which surrounds the hardened bearing button upon which the pad is tiltably supported in the retainer. Oil ducts are also drilled in the retainer and open into oil grooves which lie under the oil grooves of the pads. The gaps between the circular oil grooves in the pads and the matching circular oil grooves in the retainer are sealed by O-ring seals that surround both oil grooves and make sealing contact with both the pad and the retainer.

In the operation of this type of bearing, oil is pumped through the retainer ducts into the oil grooves in the retainer and flows from there through the oil grooves in the pads to the oil ducts therein and is discharged as jets of oil against the runner in the spaces between pads. This simultaneously lubricates and cools the bearing by replacing the hot oil film on the runner with cooler oil. Further details of this type of bearing are disclosed in U.S. Pat. No. 3,814,487.

Although the above described thrust bearing lubrication and cooling system works well on small thrust bearings, it is quite expensive when applied to large thrust bearings due to the cost of drilling the necessary multiplicity of oil ducts in the individual pads and retainer and machining the oil grooves in the pads and retainer. The cost of drilling ducts and machining circular grooves in large pads and retainers in the range of 12 to 162 inches in diameter is much higher than the cost of performing the same operation on small pads and retainers. Also, with large bearings the supporting structure for the bearing retainer is often not provided by the bearing manufacturer, and therefore, special arrangements have to be made with the manufacturer of the supporting structure to drill suitable oil feed ducts therein when the above described type of bearing lubrication and cooling system is used. In cases where the supporting structure is already built before the bearing is ordered, the provision of the required oil feed ducts in the supporting structure is even more troublesome and expensive. Accordingly, a need exists for a simpler, less expensive lubrication and cooling system which is applicable to large thrust bearings and which does not require modification of the bearing support structure.

SUMMARY OF THE INVENTION

In accordance with the present invention, the above noted problem is overcome in large thrust bearings, preferably of the tilting pad type, by having at least one oil duct in at least some of the pads, by having manifold means outwardly of peripheral portions of the pads with an oil conduit therein, and by having connections extending from said manifold means to the oil ducts in the pads, said connections being flexible where the pads are tiltable. In the preferred embodiment, each pad has at least one lateral extension from a radial edge projecting into the space between pads, which extension preferably has a face which is offset inwardly relative to the faces of the adjacent pads, each of said extensions having an oil duct therein, and the oil jet ducts being in said extensions and positioned to direct jets of oil against a portion of the runner in the spaces between adjacent pads.

DESCRIPTION OF THE DRAWINGS

FIG. 1 is a fragmentary plan view of a tilting pad thrust bearing of this invention with the runner removed to reveal the upper surface of the bearing pads.

FIG. 2 is a fragmentary radial cross-sectional view taken along the line 2—2 of FIG. 1.

FIG. 3 is a fragmentary axial view taken along the line 3—3 of FIG. 2.

FIG. 4 is a fragmentary axial sectional view taken along the line 4—4 of FIG. 2.

FIG. 5 is a fragmentary radial sectional view taken along the line 5—5 of FIG. 1.

DESCRIPTION OF THE PREFERRED EMBODIMENT

This invention will be described in connection with a tilting pad thrust bearing, although it should be understood that the invention is also applicable to thrust bearings with stationary pads.

FIG. 1 is a fragmentary plan view of a tilting pad thrust bearing including a plurality of tilting pads 10 which are supported in circumferentially spaced relationship on a conventional circular retainer which is supported by a conventional supporting structure. Each tilting pad 10 has opposed radial edges 12, an inner peripheral edge 14, and an outer peripheral edge 16. As best shown in FIG. 5, each pad 10 rests upon a cylindrical support disc 18 which in turn is tiltably supported upon the curved top 20 of a corresponding jack bolt 22 which is threaded into a portion of the supporting structure 24. An adjustment wrench 26 surrounds the head 28 of each jack bolt 22 for raising and lowering the curved top surface 20 of jack bolt 22 for the purpose of leveling the individual pads 10. Each adjustment wrench 26 has a broad slotted end 30 (FIG. 1) through which locking screws 32 (FIG. 5) extend. Locking screws 32 are threaded into a portion of the supporting structure 24 and serve to lock adjustment wrenches 26 in the selected position.

Bearing pads 10 are held together in peripherally spaced relationship by a retainer which includes a plurality of retainer segments 34 which are connected by conventional means not shown to a retainer plate 36 (FIG. 5) which has circular openings 38 therein for accommodating support discs 18. Retainer plate 36 is supported on support structure 24 by conventional means not shown. As best shown in FIG. 4, a stop lug 40 is connected to retainer ring 34 in the space between each pair of adjacent pads 10 to limit the circumferential movement of the pads 10 and to hold them spaced apart in spite of the circumferential movement forces caused by rotation of the runner 42 on top of pads 10.

The lubrication and cooling system of this embodiment, which maintains an oil film between runner 42 and the adjacent surface of pads 10, and which also cools the oil film to absorb the heat generated by the shearing of the oil in the film, includes lateral extensions 44 (FIGS. 3 and 4) that project outwardly from the radial edges 12 of pads 10 into the spaces between pads. The upper surfaces 46 of lateral extensions 44 are offset inwardly of the bearing surfaces 48 of pads 10. Each lateral extension 44 has a main oil duct 50 that extends radially therethrough and is closed on its inner end 52 (FIG. 2) and is threaded to receive an oil conduit 60 on its outer end 54. A row of oil jet ducts 56 are drilled through the top surface 46 of lateral extensions 44 and communicate into the main oil duct 50. Each of the oil jet ducts 56 are oriented to direct a jet of oil up onto the lower surface of runner 42 in the location where it makes and breaks contact with the bearing surface 48 of bearing pads 10. The adjacent corners of pads 10 are preferably beveled at 58 (FIG. 4) having an angle of approximately 30° to the bearing face 48 of pads 10 while the oil jet ducts 56 are inclined at an angle of approximately 45° to the upper surface 46 of lateral extensions 44.

Each of the main oil ducts 50 are coupled by means of a rigid conduit 60 (FIG. 2) and a flexible conduit 62 to an annular oil manifold conduit 64 which completely surrounds the outer periphery of pads 10 and is coupled to a source of oil under pressure and includes an oil pump 66 (FIG. 1) and an oil feed conduit 68. Annular oil manifold conduit 64 is supported upon a portion of the supporting structure 24 by conventional means not shown.

The oil pumped into oil manifold conduit 64 is distributed by flexible conduits 62 and rigid conduits 60 into all of the main oil ducts 50, and from there through the oil jet ducts 56 to the bearing face 49 of runner 42. These oil jets not only lubricate the bearing face 49 of runner 42 but also displace the hot oil film thereon which clings to the bearing surface 49 in the space between bearing pads 10. The hot oil which is flushed off the bearing surface 49 runs down the beveled corners 58 onto the upper surface 46 of lateral extensions 44 and from there to a conventional sump, not shown, from which the oil is returned to pump 66 by conventional means not shown. Each of the main oil ducts 50 is progressively narrowed from its outer end to its inner end to regulate the oil jets issuing from oil jet ducts 56.

The flexible oil conduits 62 which couple the oil from manifold conduit 64 to main oil ducts 50 are important because they permit the tilting pads 10 to tilt without interference. The provision of an oil manifold conduit 64 disposed outside of the outer peripheral edge of the tilting pad 10 is an important feature of the invention because it eliminates the need to drill oil ducts and machine oil grooves in the bottom of tilting pads 10 and in the support discs 18 and the supporting structure 24. Oil manifold conduit 64 provides a very substantial saving in the cost of the lubricating and cooling system for a large bearing.

Another important feature of the invention is that by directing each row of oil jets onto the bearing surface 49 of runner 42 at the points where bearing surface 49 makes and breaks contact with the bearing surface 48 of pads 10, a very complete and efficient form of lubrication is provided which eliminates the need for the flooded condition that was previously used in large bearings of this type, and thereby allows the runner 42 to be operated at higher speeds than would be possible under a flooded condition. The fact that the oil jets which issue from oil jet ducts 56 also cool the oil film on bearing surface 49, as it makes and breaks contact with the bearing surface 48 of tilting pads 10, also enables runner 42 to be operated at significantly higher speeds than have hitherto been possible. Taken together, these improvements raise the operating speeds of the bearing up to the level required by the increased operating speeds of modern rotary machinery.

Various changes and modifications may be made without departing from the spirit of the invention, and all of such changes are contemplated as may come within the scope of the claims.

What I claim is:

1. In a thrust bearing having a plurality of bearing pads which are supported in circumferentially spaced relationship on a circular retainer, and having a runner which is rotatably relative to the faces of the pads, the improvement comprising at least some of said pads having radial edges exposed to spaces between adjacent pads and having main oil ducts along said edges, oil jet ducts communicating with each main duct and having outer ends positioned to direct jets of oil against a portion of said runner in the spaces between the faces of adjacent pads, manifold means outwardly of peripheral portions of the pads and having an oil conduit therein, means connecting each main duct of a pad with the oil conduit of said manifold means, and means for supplying oil under pressure to said manifold conduit.

2. A thrust bearing as defined in claim 1 in which the bearing pads are tiltably supported, and in which the means for connecting the oil ducts of the pads to the manifold conduit are flexible.

3. A thrust bearing as claimed in claim 1 in which each pad has a main oil duct, and in which the manifold surrounds the pads and has its oil conduit connected with the duct of each pad.

4. A thrust bearing as claimed in claim 1 in which each pad has a lateral extension on at least one radial edge, each lateral extension projecting into the space between adjacent pads and being offset inwardly relative to the faces of the adjacent pads, and in which the oil jet ducts of each extension have outer ends positioned to direct jets of oil from the offset portion of said extension against a portion of the runner in the space between the faces of adjacent pads.

5. A thrust bearing as claimed in claim 4 in which the radial edge of each pad is beveled and wherein said oil jet ducts are inclined toward said beveled edge.

6. A thrust bearing as claimed in claim 5 in which each of said radial edges is beveled at an angle of about 30° to the bearing face of said bearings pad and wherein said oil jet ducts are inclined at an angle of about 45° to the adjacent surface of lateral extensions.

7. A thrust bearing as claimed in claim 1 wherein each of said main oil ducts is of progressively less diameter from its outer end to its inner end to regulate the oil jets issuing from said jet ducts.

8. In a thrust bearing having a plurality of bearing pads which are supported in circumferentially spaced relationship on a circular retainer, and which have radial edges, and said bearing having a runner which is rotatable relative to the faces of the pads, the improvement comprising a lateral extension on at least one radial edge of each pad, each lateral extension projecting into the space between adjacent pads and being offset inwardly relative to the bearing faces of the adjacent pads, a main oil duct in each lateral extension, a row of oil jet ducts communicating with each main duct and having outer ends positioned to direct jets of oil against a portion of said runner in the space between adjacent pads, and means for supplying oil under pressure to all of said main ducts.

9. The thrust bearing of claim 8 wherein the pads are tiltable and wherein said means for supplying oil under pressure to said main ducts comprises an annular oil manifold conduit supported in a position surrounding said pads, means for supplying oil under pressure to said manifold conduit, and flexible conduits coupled between said main ducts and said manifold conduit.

10. The thrust bearing of claim 8 wherein there are two lateral extensions on each pad, one lateral extension projecting from each radial edge of the pad, and wherein said oil jet ducts of each row are inclined toward the radial edge of the pad to direct said oil jets against the runner and near the radial edge where said runner makes and breaks contact with the hot oil film on the pad bearing faces.

11. The thrust bearing of claim 8 wherein each main duct extends radially with respect to said retainer and is closed on its inner end, and wherein the oil jet ducts extend upwardly from each main duct and are arranged in radial rows therealong.

* * * * *